United States Patent
Chen et al.

(10) Patent No.: US 11,733,475 B2
(45) Date of Patent: Aug. 22, 2023

(54) LENS BARREL

(71) Applicant: GENIUS ELECTRONIC OPTICAL (XIAMEN) CO., LTD., Fujian (CN)

(72) Inventors: Junjiao Chen, Fujian (CN); Jianhai Huo, Fujian (CN); Shang-Hao Su, Fujian (CN); Qingshu Ye, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 96 days.

(21) Appl. No.: 16/985,232

(22) Filed: Aug. 5, 2020

(65) Prior Publication Data
US 2021/0349282 A1     Nov. 11, 2021

(30) Foreign Application Priority Data
May 6, 2020  (CN) .......................... 202010372786.5

(51) Int. Cl.
    *G02B 7/02*     (2021.01)
(52) U.S. Cl.
    CPC ............. *G02B 7/022* (2013.01); *G02B 7/021* (2013.01)
(58) Field of Classification Search
    CPC .......... G02B 7/02; G02B 7/021; G02B 7/022; G02B 7/023
    See application file for complete search history.

(56) References Cited

U.S. PATENT DOCUMENTS

| | | | |
|---|---|---|---|
| 2009/0147381 A1* | 6/2009 | Chen | G02B 7/021 359/819 |
| 2017/0131513 A1* | 5/2017 | Lin | G02B 13/0045 |
| 2018/0024310 A1* | 1/2018 | Ma | G02B 5/005 359/740 |
| 2018/0299637 A1* | 10/2018 | Wan | G02B 5/003 |
| 2020/0314300 A1* | 10/2020 | Feng | G02B 1/11 |
| 2020/0363603 A1* | 11/2020 | Tsai | G02B 7/04 |
| 2021/0048733 A1* | 2/2021 | Lin | G02B 7/021 |
| 2021/0080684 A1* | 3/2021 | Lin | G02B 7/021 |
| 2021/0088746 A1* | 3/2021 | Liang | G02B 7/026 |

* cited by examiner

*Primary Examiner* — Ephrem Z Mebrahtu
(74) *Attorney, Agent, or Firm* — JCIPRNET

(57) ABSTRACT

A lens barrel includes a front end portion. The front end portion includes an outer surface facing toward an object side and an inner surface facing toward an image side. The inner surface includes an inner side conical surface. The inner side conical surface is connected to the outer surface. The inner-side conical surface includes a plurality of toothed structures, an inner edge near an optical axis and an outer edge away from the optical axis. The outer edge is closer to the image side than the inner edge. The inner edge forms a clear hole. Each of the toothed structures includes a tooth peak and a tooth valley. The tooth peak and the tooth valley are disposed at the inner edge, and the tooth peak extends from the inner edge to the outer edge to form a convex strip.

15 Claims, 8 Drawing Sheets

LENS BARREL

CROSS-REFERENCE TO RELATED APPLICATION

This application claims the priority benefit of China application serial no. 202010372786.5, filed on May 6, 2020. The entirety of the above-mentioned patent application is hereby incorporated by reference herein and made a part of this specification.

BACKGROUND OF THE INVENTION

1. Field of the Invention

The invention relates to a lens barrel.

2. Description of Related Art

In the current process of manufacturing a plastic lens barrel through injection molding, due to the limitation of the plastic material, clear holes of the lens barrel are unable to exhibit a pointy-corner structure as designed in the mold, but exhibit a rounded-corner structure. When light beams from different angles are emitted to the rounded-corner structure of the clear hole, shower flare is generated. The current solution is to irregularly haze the insert mold for the inner surface of the rounded-corner structure by laser engraving. However, the shower flare remains significant. Thus, further efforts are still required.

SUMMARY OF THE INVENTION

The invention provides a lens barrel that reduces shower flare generated in an optical imaging lens using the lens barrel.

A lens barrel according to an embodiment of the invention includes a front end portion. The front end portion includes an outer surface facing toward an object side and an inner surface facing toward an image side. The inner surface includes an inner side conical surface. The inner side conical surface is connected to the outer surface. The inner-side conical surface includes a plurality of toothed structures, an inner edge near an optical axis and an outer edge away from the optical axis. The outer edge is closer to the image side than the inner edge. The inner edge forms a clear hole. Each of the toothed structures includes a tooth peak and a tooth valley. The tooth peak and the tooth valley are disposed at the inner edge, and the tooth peak extends from the inner edge to the outer edge to form a convex strip.

According to an embodiment of the invention, the clear hole formed by the inner edge is a minimum clear hole in the lens barrel. A vertical distance from any point on the inner edge to the optical axis is smaller than a vertical distance from any point on the lens barrel not on the inner edge to the optical axis.

According to an embodiment of the invention, a width of each of the convex strips gradually increases toward the outer edge.

According to an embodiment of the invention, an interval of each of the convex strips gradually decreases toward the outer edge.

According to an embodiment of the invention, the outer surface further includes a front-end conical surface, the front-end conical surface of the outer surface is connected with the inner side conical surface of the inner surface, and a reference plane including the optical axis is defined, A front end extending line of a front end sectional line of the front-end conical surface defined by the reference plane and the optical axis define a front end included angle, and the front end included angle satisfies a condition as follows: $5°≤θ_f≤70°$, wherein $θ_f$ represents the front end included angle.

According to an embodiment of the invention, a reference plane including the optical axis is defined. An inner side extending line of an inner side sectional line of the inner side conical surface defined by the reference plane and the optical axis define an inner side included angle. The inner side included angle satisfies a condition as follows: $20°≤θ_i≤90°$, wherein $θ_i$ represents the inner side included angle.

According to an embodiment of the invention, a reference plane including the optical axis is defined. The outer surface further includes a front-end conical surface, and the front-end conical surface of the outer surface is connected with the inner side conical surface of the inner surface. A front end sectional line of the front-end conical surface defined by the reference plane and an inner side sectional line of the inner side conical surface defined by the reference plane define a front-end-and-inner-side included angle. The front-end-and-inner-side included angle satisfies a condition as follows: $θ_{fi}≥40°$, wherein $θ_{fi}$ represents the front-end-and-inner-side included angle.

According to an embodiment of the invention, the tooth valley extends in the direction from the inner edge toward the outer edge to form a recess relative to the convex strip, and a vertical reference plane passing through the convex strips and the recesses and perpendicular to the direction in which the convex strips extend is defined. In the vertical reference plane, a distance is present between a top surface center of a cross-section of each of the convex strips and a center of the corresponding and adjacent recess. The lens barrel satisfies a condition as follows: $Dh≥4$ μm, wherein $Dh$ represents a projection amount of the distance along a normal direction of the inner side conical surface.

According to an embodiment of the invention, the tooth valley extends in the direction from the inner edge toward the outer edge to form a recess relative to the convex strip, and a vertical reference plane passing through the convex strips and the recesses and perpendicular to the direction in which the convex strips extend is defined. In the vertical reference plane, a distance is present between a top surface center of a cross-section of each of the convex strips and a center of the corresponding and adjacent recess. The lens barrel satisfies a condition as follows: $35$ μm$≥Dw≥15$ μm, wherein $Dw$ represents a projection amount of the distance along a circumferential direction of the inner side conical surface.

According to an embodiment of the invention, a vertical reference plane passing through the convex strips and perpendicular to the direction in which the convex strips extend is defined. A cross-section of each of the convex strips defined by the vertical reference plane is a rectangle-like cross-section. That is, the cross-sections are all in a shape that is like or similar to a rectangle or is substantially a rectangle.

According to an embodiment of the invention, the tooth valley extends in the direction from the inner edge toward the outer edge to form a recess. A vertical reference plane passing through the convex strips and the recesses and perpendicular to the direction in which the convex strips extend is defined. In the vertical reference plane, the lens barrel satisfies a condition as follows: $35$ μm$≥Wp≥15$ μm;

and 25 μm≥Wr≥5 μm, wherein Wp represents a width of each of the convex strips, and Wr represents a width of the recess.

According to an embodiment of the invention, a vertical reference plane passing through the convex strips and perpendicular to the direction in which the convex strips extend is defined. A cross-section of each of the convex strips defined by the vertical reference plane is a triangle-like cross-section.

According to an embodiment of the invention, a vertical reference plane passing through the convex strips and perpendicular to the direction in which the convex strips extend is defined. A cross-section of each of the convex strips defined by the vertical reference plane is a trapezoid-like cross-section.

According to an embodiment of the invention, a clear hole of the lens barrel closest to the object side is an object side clear hole. The lens barrel further satisfies a condition as follows: $6.00 \geq D_o/D_{min} 1.05$, wherein $D_o$ represents a diameter of the object side clear hole, and $D_{min}$ represents a diameter of the minimum clear hole.

According to an embodiment of the invention, a clear hole of the lens barrel closest to the image side is an image side clear hole. The lens barrel further satisfies a condition as follows: $9.00 \geq D_i/D_{min} \geq 1.00$, wherein $D_i$ represents a diameter of the image side clear hole, and $D_{min}$ represents a diameter of the minimum clear hole.

According to an embodiment of the invention, the lens barrel is adapted to mount an optical imaging lens comprising a plurality of lens elements, the lens elements are sequentially arranged from the object side to the image side, and each of the lens elements has an object side surface facing toward the object side and allowing an imaging beam to pass through and an image side surface facing toward the image side and allowing the imaging beam to pass through. The lens barrel further satisfies a condition as follows: $3.10 \geq TL/D_{min} 0.60$, wherein TL represents a distance on the optical axis from the object side surface of the lens element closest to the object side to the image side surface of the lens element closest to the image side, and $D_{min}$ is a diameter of the minimum clear hole.

Based on the above, in the lens barrel according to the embodiments of the invention, since the inner side conical surface is provided with the toothed structures, each toothed structure includes the tooth peak and the tooth valley disposed on the inner edge of the inner side conical surface, and the tooth peak extends from the inner edge of the inner side conical surface toward the outer edge of the inner side conical surface to form the convex strip. With the toothed structures, stray light can be scattered, and the intensity thereof can be reduced. Accordingly, the shower flare of the optical imaging lens mounted in the lens barrel can be alleviated.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
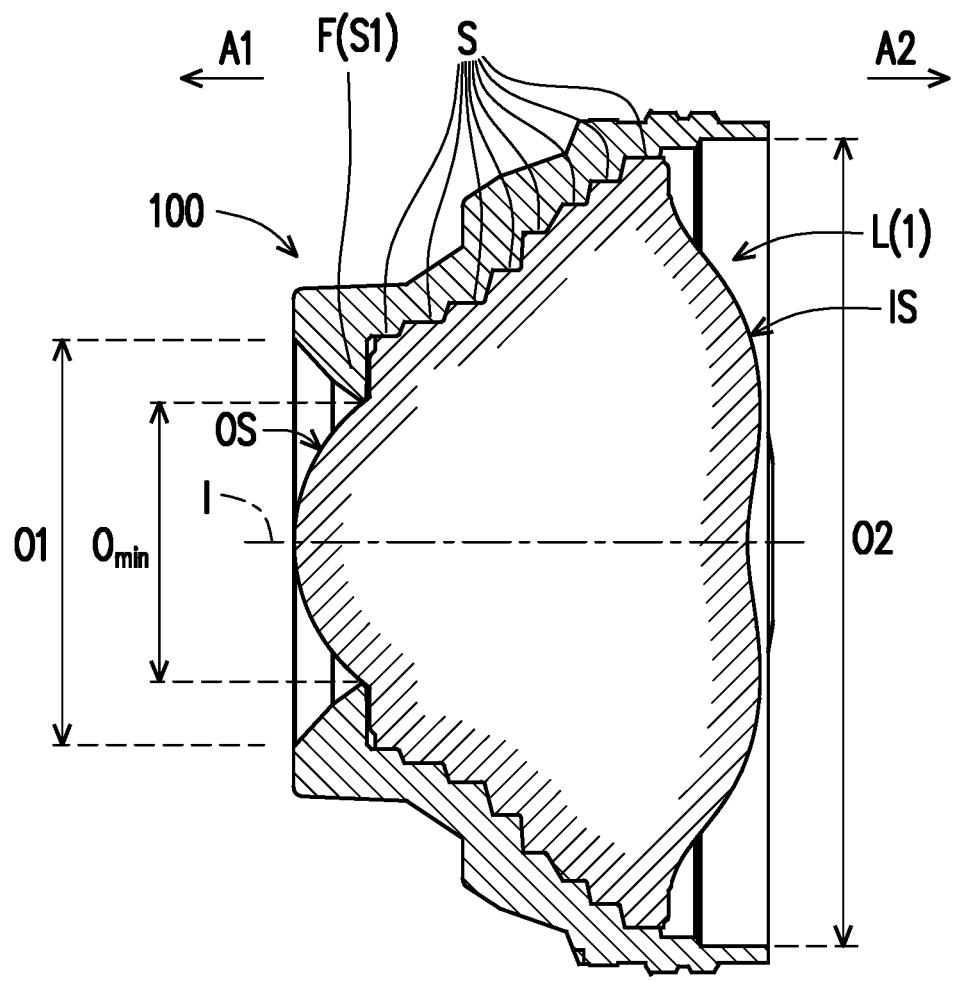
FIG. 1 is a schematic cross-sectional view illustrating a lens barrel in which an optical imaging lens is mounted according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
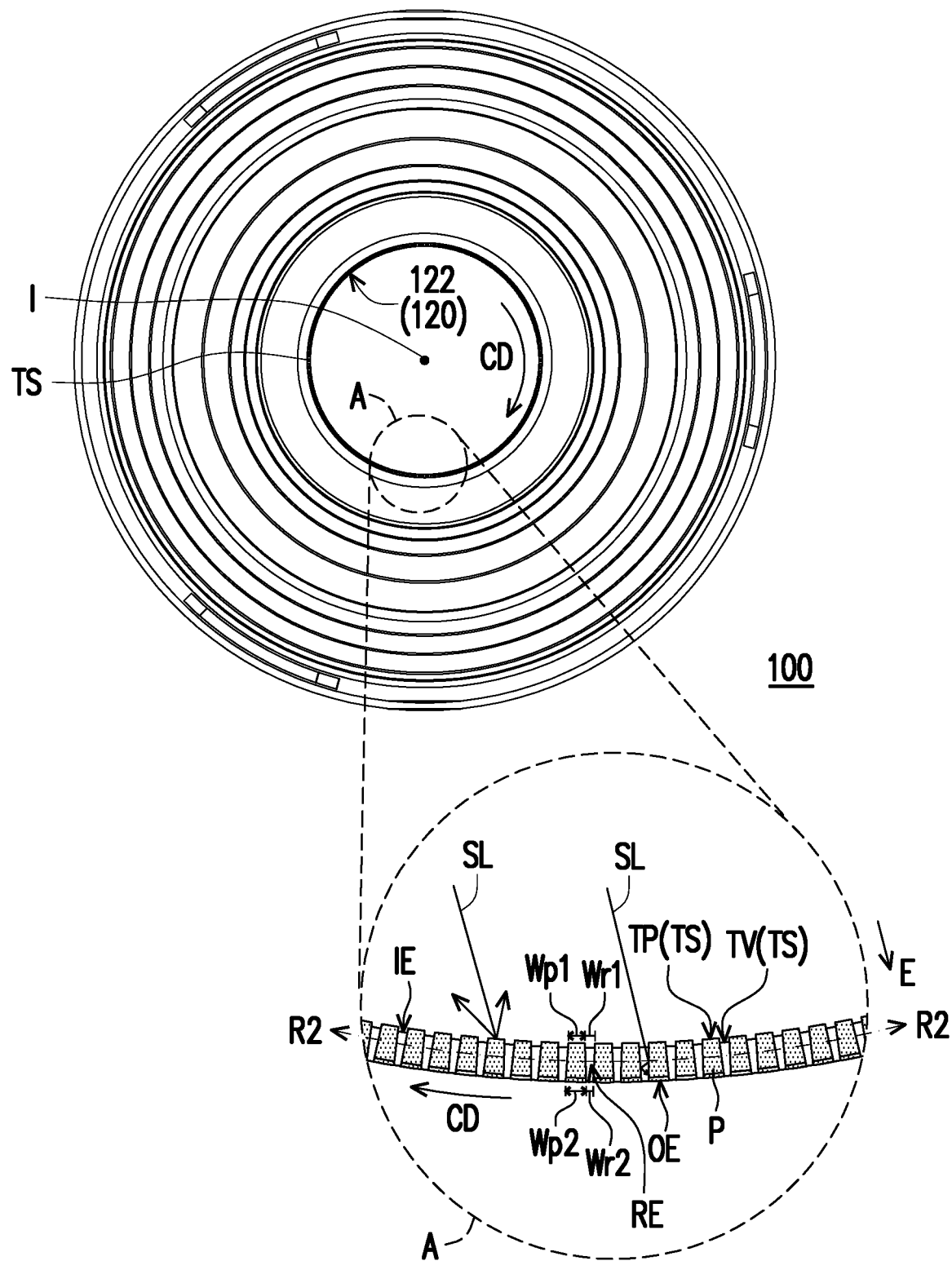
FIG. 2 is a front view illustrating a lens barrel in which an optical imaging lens is not mounted when viewed in a direction from an image side to an object side together with a partially enlarged view of a region A.
Figure 3:
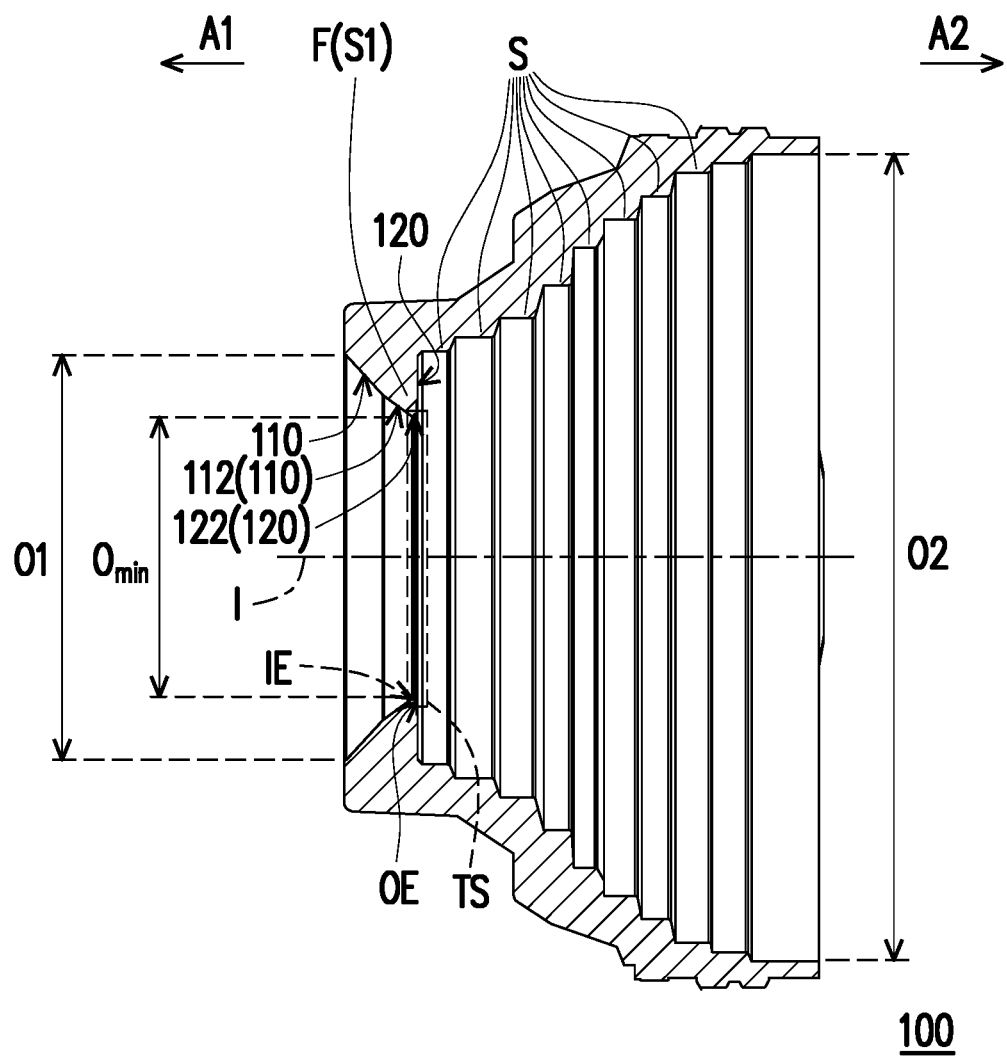
FIG. 3 is a schematic cross-sectional view illustrating a lens barrel in which an optical imaging lens is not mounted.
Figure 4:
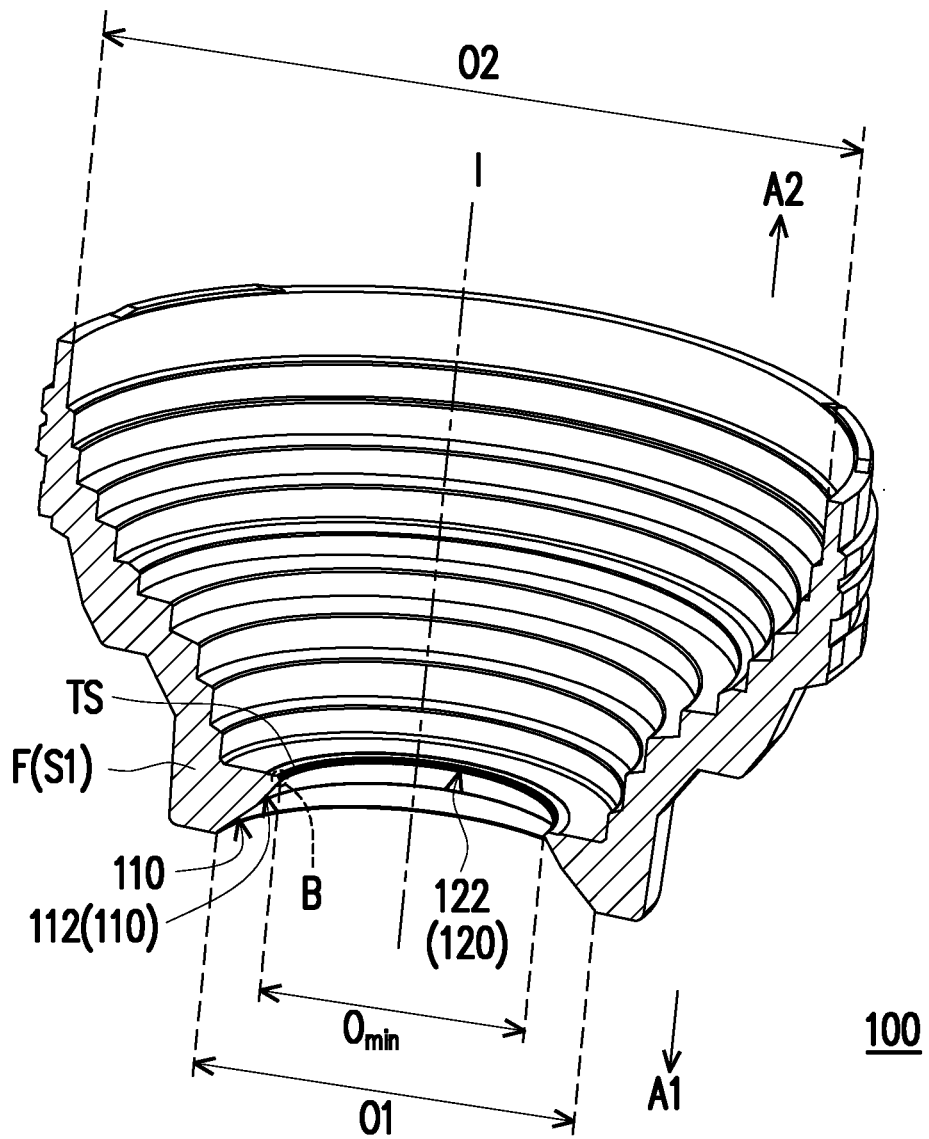
FIG. 4 is a perspective cross-sectional view illustrating the lens barrel of FIG. 1.
Figure 5:
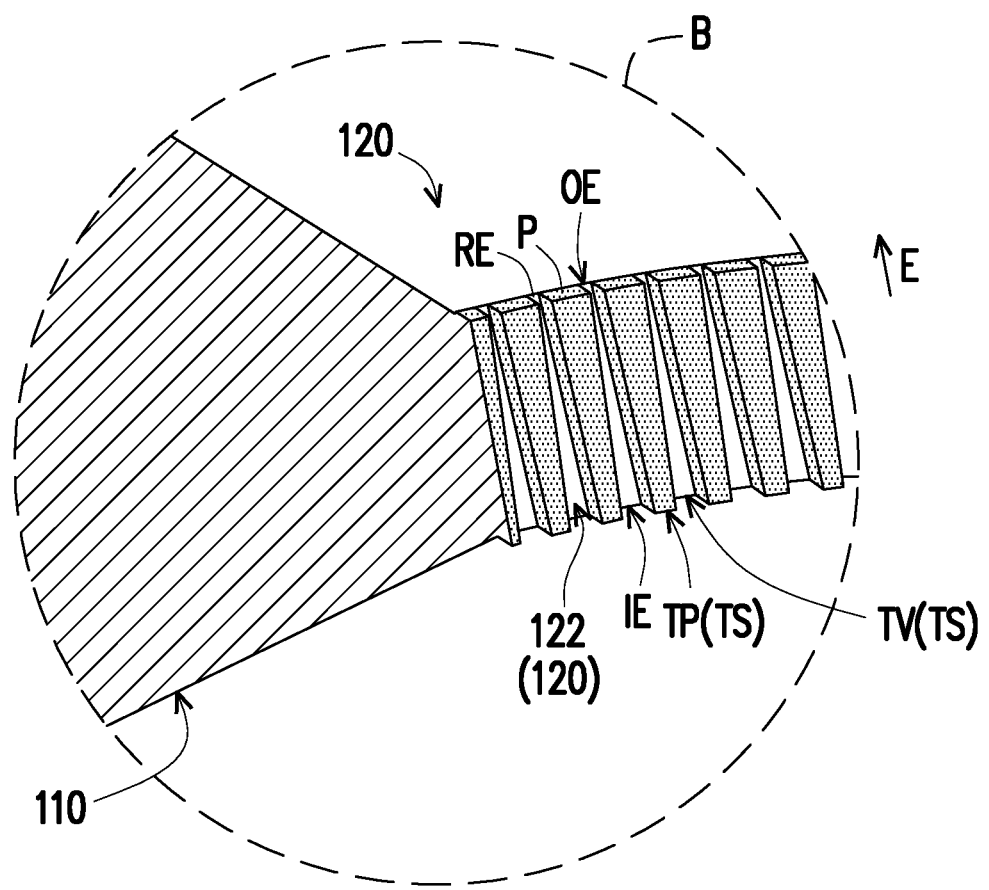
FIG. 5 is a schematic enlarged view illustrating a region B of FIG. 4.
Figure 6:
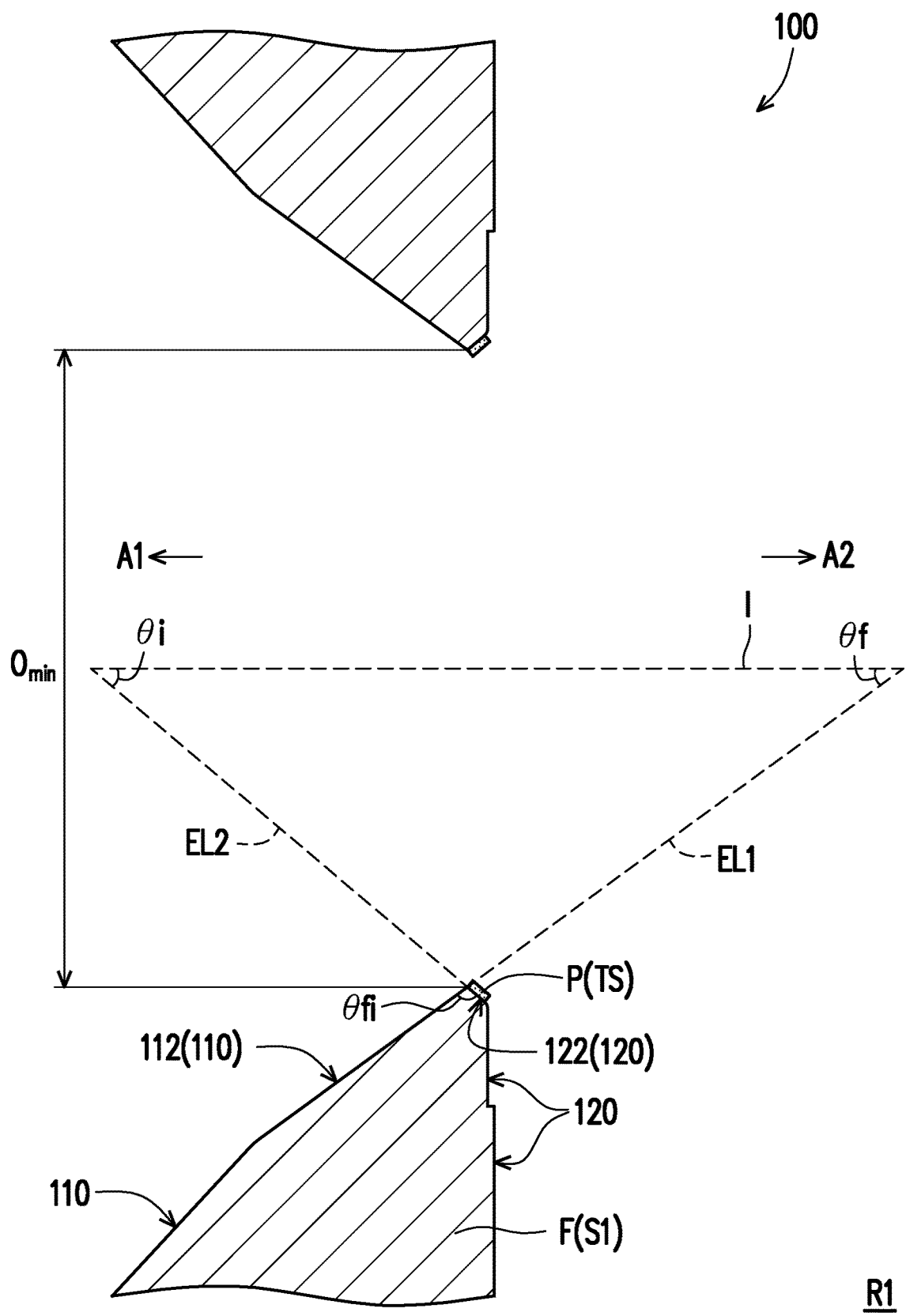
FIG. 6 is a schematic view illustrating a cross-section of a lens barrel on a reference plane.
Figure 7:
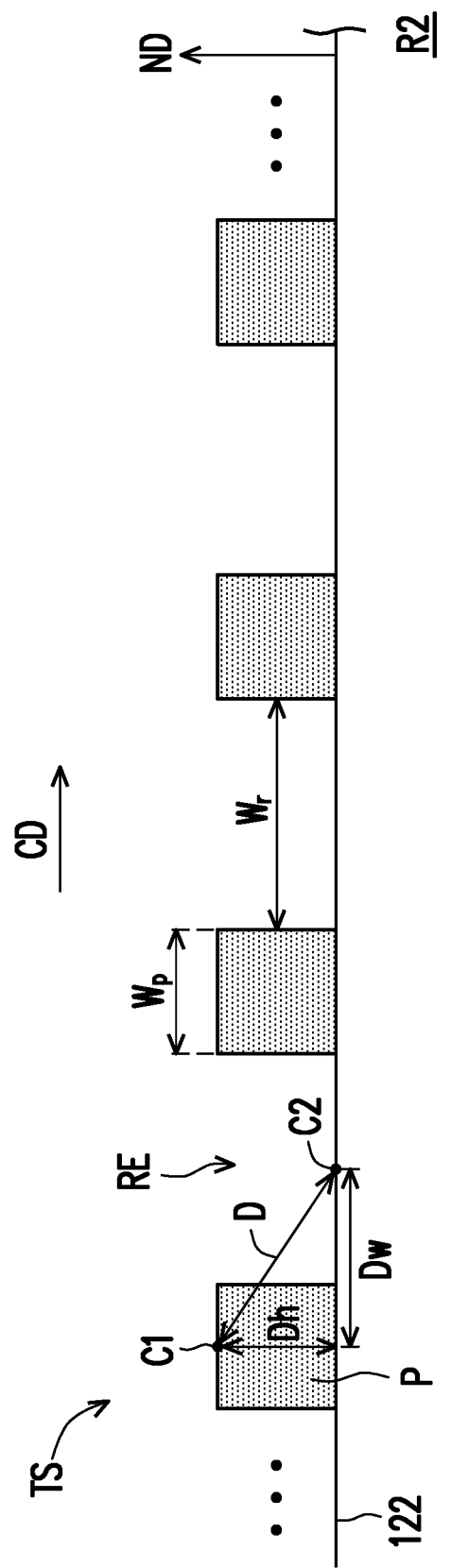
FIG. 7 is a schematic cross-sectional view illustrating a cross-section of the lens barrel in the embodiment of FIG. 1 on a vertical reference plane.

FIG. 1 is a schematic cross-sectional view illustrating a lens barrel in which an optical imaging lens is mounted according to an embodiment of the invention. FIG. 2 is a front view illustrating a lens barrel in which an optical imaging lens is not mounted when viewed in a direction from an image side to an object side together with a partially enlarged view of a region A. FIG. 3 is a schematic cross-sectional view illustrating a lens barrel in which an optical imaging lens is not mounted. FIG. 4 is a perspective cross-sectional view illustrating the lens barrel of FIG. 1. FIG. 5 is a schematic enlarged view illustrating a region B of FIG. 4. FIG. 6 is a schematic view illustrating a cross-section of a lens barrel on a reference plane. FIG. 7 is a schematic cross-sectional view illustrating a cross-section of the lens barrel in the embodiment of FIG. 1 on a vertical reference plane.

Referring to FIG. 1, in the embodiment, a lens barrel 100 has an optical axis I and is adapted to mount an optical imaging lens 1 including a plurality of lens elements L. It should be noted that, for the brevity of illustration, only an object side surface OS of the first lens element and an image side surface IS of the last lens element among the lens elements L are shown in FIG. 1. The invention does not intend to limit the number of lens elements, the shapes of lens elements, or the pitches between lens elements in the optical imaging lens 1. People having ordinary skills in the art may design the aforementioned parameters in correspondence with different optical requirements. The respective components will be described in detail in the following.

The lens barrel 100 is a component adapted to mount the lens elements L and serves to protect an internal optical path inside the optical imaging lens 1. The material of the lens barrel 100 includes plastics, for example. The details of the structure thereof will be described in the following.

Referring to FIGS. 1, 2, 3, 4, and 5, the lens barrel 100 has a plurality of stages S for the lens elements L to lean against. The stages S are components or structures adapted to limit the lateral movement of the lens elements L in the optical imaging lens 1. As shown in FIG. 3, in the embodiment, a stage S1 (also referred to as a front end portion F) of the lens barrel 100 that is closest to an object side A1 includes an outer surface 110 facing toward the object side A1 and an inner surface 120 facing toward an image side A2. The outer surface 110 includes a front-end conical surface 112, and the inner surface 120 includes an inner-side conical surface 122. The inner-side conical surface 122 is connected with the front-end conical surface 112 of the outer surface 110. The inner-side conical surface 122 includes a plurality of toothed structures TS, an inner edge IE near the optical axis I and an outer edge OE away from the optical axis I. The outer edge OE is parallel to the inner edge IE. The toothed structures TS are manufactured by laser engraving, for example. However, the invention is not limited thereto. Each of the toothed structures TS includes a tooth peak TP and a tooth valley TV. In addition, the tooth peak TP and the tooth valley TV are both disposed on the inner edge IE. The tooth peak TP extends in a direction E from the inner edge IE toward the outer edge OE to form a convex strip P, and the tooth valley TV extends in the direction E from the inner edge IE toward the outer edge OE to form a recess RE. Referring to FIG. 2, the toothed structures TS are regularly arranged in a circumferential direction CD to surround the optical axis I, such as being regularly and equidistantly arranged in the circumferential direction CD. The circumferential direction CD is defined as, for example, a direction parallel to the outer edge OE or the inner edge IE. In other embodiments, the toothed structures may also be arranged irregularly. The invention does not intend to impose a limitation on this regard. The mold for the toothed structures TS is manufactured by laser-engraving an insert mold of the inner conical surface 122 and then molding a plastic material by injection molding using the engraved mold to form the toothed structures TS.

Referring to FIGS. 2 and 5, the width of each convex strip P gradually increases in the direction E from the inner edge IE toward the outer edge OE. That is, the width of the convex strip P gradually increases toward the outer edge OE. Comparatively, the width of each recess RE gradually decreases in the direction from the inner edge IE toward the outer edge OE. That is, the width of the recess RE gradually decreases toward the outer edge OE. With the above design, shower flare may be reduced by increasing the number of times of reflection after stray light is incident to the recesses RE. Referring to FIG. 2, specifically, the range of the width of the convex strip P falls within the range of 19.5 micrometers to 23.7 micrometers. In addition, a width Wp1 of the convex strip P aligned with the inner edge IE is 19.5 micrometers, and a width Wp2 of the convex strip P aligned with the outer edge OE is 23.7 micrometers. The width of the recess RE falls within the range of 8 micrometers to 12 micrometers. In addition, a width Wr1 of the recess RE aligned with the inner edge IE is 12 micrometers, and a width Wr2 of the convex strip P aligned with the outer edge OE is 8 micrometers.

In addition, referring to FIGS. 1, 3, and 4, a clear hole of the lens barrel 100 closest to the object side A1 is referred to as an object side clear hole O1, and a clear hole of the lens barrel 100 closest to the image side A2 is referred to as an image side clear hole O2. In addition, the inner edge IE of the inner side conical surface 122 forms a clear hole, and a vertical distance from any point on the inner edge IE to optical axis I is smaller than a vertical distance from any point on the lens barrel 100 not on the inner edge to the optical axis I. In other words, the clear hole formed on the inner edge IE is a minimum clear hole $O_{min}$ with a minimum diameter. The minimum clear hole $O_{min}$ serves as the boundary between the outer surface 110 and the inner surface 120. The outer surface 110 is near the object side A1 with respect to the minimum clear hole $O_{min}$, and the inner surface 120 is near the image side A2 with respect to the minimum clear hole $O_{min}$.

Each of the lens elements L is, for example, an optical component having refracting power. The lens elements L are sequentially arranged along the optical axis I from the object side A1 to the image side A2. Each of the lens elements has an object side surface that faces toward the object side and allows imaging rays to pass through as well as an image side that faces toward the image side A2 and allows the imaging rays to pass through. The lens elements L lean against the lens barrel 100 through the stages S. In addition, the first lens element from the object side A1 leans against the stage S1.

In the following, the optical effect of the optical imaging lens 1 of the embodiment will be described in detail. Referring to FIG. 1, when a light beam emitted by an object to be shot (not shown) enters the lens barrel 100 from the object side clear hole O1, the light beam sequentially passes through the respective lens elements L inside the optical imaging lens 1, exits the lens barrel 100 from the image side clear hole O2, and forms an image on an image plane on a rear end. In theory, a light beam that is not specifically designed should generally be blocked by a pointy corner formed by the minimum clear hole to avoid stray light. However, due to limitation of the plastic material, the clear hole formed by injection molding is unable to present the pointy-corner structure as designed in the mold, but instead forms a rounded-corner structure. Referring to FIGS. 2 and 5, even though the light beam is reflected by the rounded-corner structure (not shown) of the minimum clear hole $O_{min}$ inside the lens barrel 100 to generate shower flare SL during the light incident process, with the design of the toothed structures TS on the inner side conical surface 122 as well as the concave/convex structures such as the tooth peaks TS and the tooth valleys TV of the toothed structures TS, the lens barrel 100 of the embodiment reduces the shower flare SL. When a light beam is transmitted into the structures of the recesses RE of the toothed structures TS, a portion of the shower flare SL is reflected for a plurality of times in the structures of the recesses RE, so the intensity of the shower flare SL is reduced. The toothed structures TS are therefore able to reduce the influence of the shower flare SL. If the shower flare SL is transmitted to the rounded-corner structure (not shown), the shower flare SL is directly reflected by the rounded-corner structure to be emitted in a specific direction. In such case, the intensity of the shower flare SL cannot be reduced, and the shower flare SL may significantly affect the image formed on the rear end. In other words, by disposing the toothed structures TS on the inner edge IE of the inner side conical surface 122, the continuous reflection surface of the rounded-corner structure is destructed, and the reflection path on which the shower flare SL is emitted along a specific direction is also destructed. Accordingly, the toothed structures TS can scatter and reduce the concentrated shower flare SL. Accordingly, the optical imaging lens 1 using the lens barrel 100 is able to alleviate shower flare.

In the following, different designs and structures of the lens barrel 100 of the embodiment will be described in detail with reference to FIGS. 6 and 7.

Referring to FIG. 6, a reference plane R1 including the optical axis I and passing through the center of the inner side conical surface 122 and the center of the front-end conical surface 112 is defined. A front end extending line EL1 of a front end sectional line of the front-end conical surface 112 defined by the reference plane R1 and the optical axis I define a front end included angle $\theta_f$, and the front end included angle $\theta_f$ satisfies the following condition (1):

$$5° \leq \theta_f \leq 70° \quad (1).$$

When $\theta_f$ is greater than 70 degrees, it becomes difficult to mold the minimum clear hole $O_{min}$ and the range of the rounded-corner structure (not shown) is increased, which facilitates the influence of the shower flare SL. When $\theta_f$ is less than 5 degrees, the reflected stray light on the front-end conical surface 112 is increased. Therefore, if the lens barrel 100 satisfies the range of the condition (1) above, the above issues may be avoided. In addition, the range of the condition (1) is preferably $20° \leq \theta_f \leq 50°$.

Referring to FIG. 6, an inner side extending line EL2 of an inner side sectional line of the inner side conical surface 122 defined by the reference plane R1 and the optical axis I define an inner side included angle $\theta_i$. The inner side included angle $\theta_i$ satisfies the following condition (2):

$$20° \leq \theta_i \leq 90° \quad (2).$$

When $\theta_i$ is greater than 90 degrees, it becomes difficult to mold the minimum clear hole $O_{min}$ and the range of the rounded-corner structure (not shown) is increased, which facilitates the influence of stray light. When $\theta_i$ is less than 20 degrees, it becomes difficult to match the curvature of the lens elements L of the optical imaging lens 1, so it becomes difficult to assemble the lens elements L. Therefore, if the lens barrel 100 satisfies the range of the condition (2) above, the above issues may be avoided. In addition, the range of the condition (2) is preferably $30° \leq \theta_i \leq 80°$.

Referring to FIG. 6, the front end sectional line of the front-end conical surface 112 defined by the reference plane R1 and the inner side sectional line of the inner side conical surface 122 defined by the reference plane R1 define a front-end-and-inner-side included angle $\theta_{fi}$. The front-end-and-inner-side included angle $\theta_{fi}$ satisfies the following condition (3):

$$\theta_{fi} \geq 40° \quad (3).$$

In addition, the range of the condition (3) is preferably $90° \leq \theta_{fi} \leq 150°$. When $\theta_{fi}$ is less than 40 degrees, it becomes difficult to mold the minimum clear hole $O_{min}$ and the range of the rounded-corner structure (not shown) is increased, which facilitates the influence of the shower flare SL. When $\theta_{fi}$ is less than 150 degrees, the reflected stray light of the front-end conical surface 112 is increased. Therefore, if the lens barrel 100 satisfies the preferable range of the condition (3) above, the above issues may be avoided.

Referring to FIGS. 2 and 7, a vertical reference plane R2 passing through the convex strips P and the recesses RE and perpendicular to the extending direction E of the convex strips P is defined. The cross-section of each convex strip P defined by the vertical reference plane is a rectangle-like cross-section. With such cross-section and the design that the width of the convex strip P gradually increases toward the outer edge OE and the width of each recess RE (i.e., interval of the convex strip) gradually decreases from the inner edge IE toward the outer edge OE, the number of times that stray light is reflected between the teeth can be increased. A distance D is present between a top surface center C1 of the cross-section of each convex strip P defined by the vertical reference plane R2 and a center C2 of the corresponding and adjacent recess RE, and Dh represents a first projection amount of the distance D along a normal direction ND of the inner side conical surface 122. The lens barrel 100 satisfies the following condition (4):

$$Dh \geq 2 \text{ } \mu m \quad (4).$$

In addition, the range of the condition (4) is preferably 7 $\mu m \geq Dh \geq 4$ $\mu m$. $Dh \geq 2$ $\mu m$ helps destruct the continuous reflection surface of the rounded-corner structure (not shown) to reduce the intensity of the shower flare SL. When Dh falls within the preferable range of the condition (4), extra shadow that affects the imaging quality can be avoided. Specifically, the design where Dh is 5 $\mu m$ is adopted for the lens barrel 100 of the embodiment. The stray light of the image thereof is not significant and no extra shadow is generated. When Dh is 8 $\mu m$, a shadow is generated.

Dw is a projection amount of the distance D along the circumferential direction CD of the inner side conical surface 130. The lens barrel 100 may further satisfy the following condition (5):

$$35 \text{ } \mu m \geq Dw \geq 15 \text{ } \mu m \quad (5).$$

In the lens barrel according to the embodiment, in addition to the design where the width of the convex strip P gradually increases in the extending direction E, if the design of the above condition (5) is satisfied, the number of times that stray light TS is reflected between the convex strips P can be increased, so as to further reduce the intensity of stray light. If Dw is greater than 35 $\mu m$, there may be a greater exposed portion of the inner side conical surface 122, and it is still possible that a portion of the shower flare SL is reflected here to maintain a certain level of intensity. If Dw is less than 15 $\mu m$, the degree of reduction of the shower flare SL is not significant, and the manufacturing complexity is higher.

Referring to FIG. 7, in the vertical reference plane R2, the lens barrel 100 may further satisfy the following conditions (6) and (7):

$$35 \text{ } \mu m \geq Wp \geq 15 \text{ } \mu m \quad (6);$$

$$25 \text{ } \mu m \geq Wr \geq 5 \text{ } \mu m \quad (7).$$

Wp represents the width of each convex strip P in the circumferential direction CD, and Wr represents the width of the recess RE in the circumferential direction CD. In the lens barrel 100 according to the embodiment, in addition to the design where the width of the convex strip P gradually increases in the extending direction E, if the width design of the above conditions (6) and (7) is satisfied, the number of times that shower flare SL is reflected between the convex strips P can be increased, so as to further reduce the intensity of the stray light. If Wr is greater than 25 $\mu m$, there may be a greater exposed portion of the inner side conical surface 122, and it is still possible that a portion of the shower flare SL is reflected here to maintain a certain level of intensity. If Wr is less than 5 $\mu m$, the degree of reduction of the shower flare SL is not significant, and the manufacturing complexity is higher.

Referring to FIG. 1, the object side clear hole O1 and the minimum clear hole $O_{min}$ of the lens barrel 100 may further satisfy the following condition (8):

$$6.00 \geq D_o/D_{min} \geq 1.05 \quad (8).$$

In the lens barrel 100 of the embodiment, satisfying the design of the above condition (8) helps dispose the toothed structures TS on the lens barrel 100 to reduce the shower flare SL of the optical imaging lens 1. Preferably, the range is: $2.80 \geq D_o/D_{min} \geq 1.30$.

Referring to FIG. 1, the image side clear hole O2 and the minimum clear hole $O_{min}$ of the lens barrel 100 may further satisfy the following condition (9):

$$9.00 \geq D_i/D_{min} \geq 1.00 \quad (9).$$

$D_i$ represents the diameter of the image side clear hole O2, and $D_{min}$ is the diameter of the minimum clear hole $O_{min}$. In the lens barrel 100 of the embodiment, the design satisfying the above condition (9) helps dispose the toothed structures TS on the lens barrel 100 to reduce the shower flare SL of the optical imaging lens 1. Preferably, the range for the above condition (9) is: $6.00 \geq D_o/D_{min} \geq 1.50$.

Referring to FIG. 1, the optical imaging lens 1 mounted in the lens barrel 100 and the minimum clear hole $O_{min}$ of the lens barrel 100 may further satisfy the following condition (10):

$$5.00 \geq TL/D_{min} \geq 0.60 \qquad (10).$$

TL represents the distance on the optical axis I between the object side surface OS of the lens element closest to the object side A1 in the lens elements L and the image side surface IS of the lens element closest to the image side A2 in the lens elements L. In the lens barrel 100 of the embodiment, satisfying the design of the above condition (10) helps dispose the toothed structures TS on the lens barrel 100 to reduce the shower flare SL of the optical imaging lens 1. Preferably, the range for the above condition (10) is: $3.10 \geq TL/D_{min} \geq 0.80$.

It should be noted that the following embodiments incorporate a portion of the above embodiment. In addition, the descriptions for repeated technical contents are omitted. Details about components named with the same terms may be referred to relevant contents of the above embodiment and therefore will not be repeated in the following.

Figure 8A:
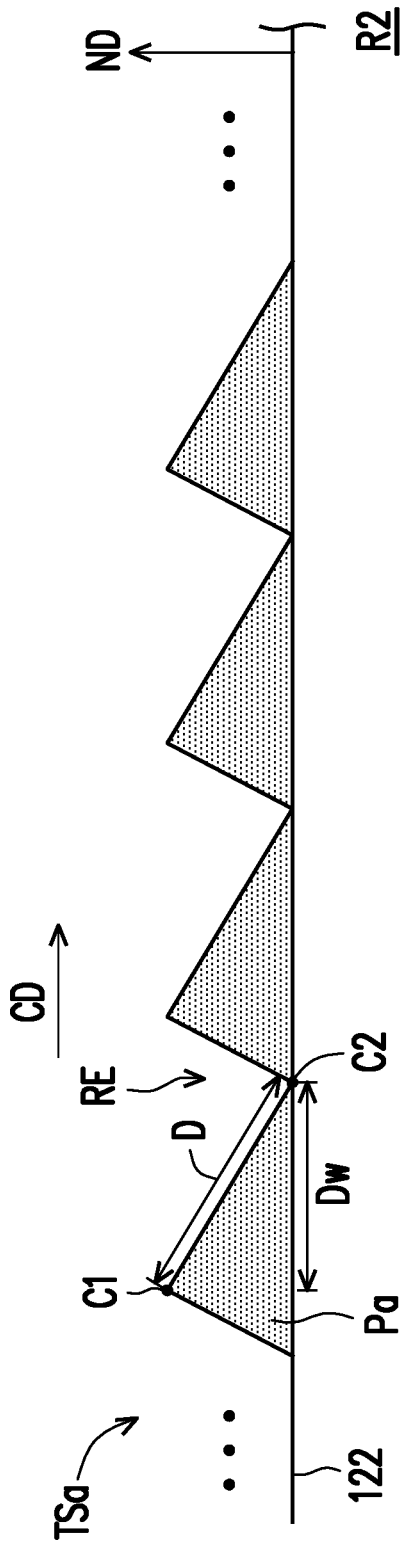
FIGS. 8A and 8B are schematic cross-sectional views illustrating cross-sections of lens barrels of different embodiments on a vertical reference plane.
Figure 8B:
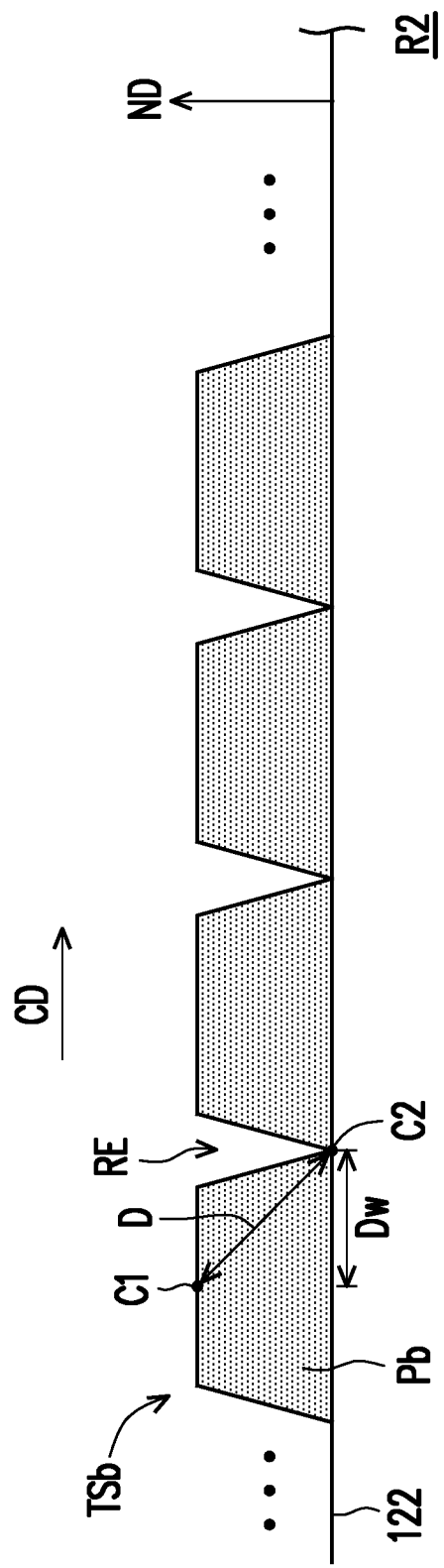

FIGS. 8A and 8B are schematic cross-sectional views illustrating cross-sections of lens barrels of different embodiments on a vertical reference plane.

Referring to FIG. 8A, the definition of the vertical reference plane R2 thereof is similar to the definition set forth for FIG. 7, while a different design and arrangement may be adopted for toothed structures TSa. The main difference lies in that convex strips Pa are connected with each other, and the cross-section of the convex strip Pa defined by the vertical reference plane R2 is a triangle-like cross-section. With such cross-section and the design of the convex strip Pa that the width gradually increases toward the outer edge OE or the design that the width of each recess RE gradually decreases from the inner edge IE toward the outer edge OE, the number of times that the stray light is reflected between the teeth can be increased. In addition, compared with cross-sections of other shapes, the triangle-like cross-section allows a design with the greatest number of the toothed structures TS for reducing the shower flare SL. In addition, in the vertical reference plane R2, the distance D is present between the top portion center C1 of the cross-section of each convex strip Pa and the center C2 of the corresponding and adjacent recess RE, and Dw represents the projection amount of the distance D along the circumferential direction CD of the inner side conical surface 130. The lens barrel 100 may further satisfy the following condition (5):

$$35 \ \mu m \geq Dw \geq 15 \ \mu m \qquad (5).$$

In the lens barrel according to the embodiment, with the design where the width of the convex strip Pa gradually increases in the extending direction E, if the design of the above condition (10) is satisfied, the number of times that stray light is reflected between the convex strips Pa can be increased, so as to further reduce the intensity of the stray light. If Dw is greater than 35 μm, there may be a greater exposed portion of the inner side conical surface 122, and it is still possible that a portion of the shower flare SL is reflected here to maintain a certain level of intensity. If Dw is less than 15 μm, the degree of reduction of the shower flare SL is not significant, and the manufacturing complexity is higher.

Referring to FIG. 8B, the definition of the vertical reference plane R2 thereof is similar to the definition for FIG. 7, while a different design and arrangement may be adopted for toothed structures TSb. The main difference lies in that convex strips Pb re connected with each other, and the cross-section of the convex strip Pb defined by the vertical reference plane R2 is a trapezoid-like cross-section. With such cross-section and the design that the width of the convex strip Pb gradually increases toward the outer edge OE or the design that the width of each recess RE gradually decreases from the inner edge IE toward the outer edge OE, the number of times that the stray light is reflected between the teeth can be increased. In addition, in the vertical reference plane R2, the distance D is present between a top surface center Tb of the cross-section of each convex strip Pb and the center C2 of the corresponding and adjacent recess RE, and Dw represents the projection amount of the distance D along the circumferential direction CD of the inner side conical surface 130. The lens barrel 100 may further satisfy the following condition (5):

$$35 \ \mu m \geq Dw \geq 15 \ \mu m \qquad (5).$$

In the lens barrel according to the embodiment, in addition to the design where the width of the convex strip Pb gradually increases in the extending direction E, if the design of the above condition (5) is satisfied, the number of times that stray light is reflected between the convex strips Pb can be increased, so as to further reduce the intensity of the stray light. If Dw is greater than 35 μm, there may be a greater exposed portion of the inner side conical surface 122, and it is still possible that a portion of the shower flare SL is reflected here to maintain a certain level of intensity. If Dw is less than 15 μm, the degree of reduction of the shower flare SL is not significant, and the manufacturing complexity is higher.

In view of the foregoing, in the lens barrel according to the embodiments of the invention, since the inner side conical surface is provided with the toothed structures, each toothed structure includes the tooth peak and the tooth valley disposed on the inner edge of the inner side conical surface, and the tooth peak extends from the inner edge of the inner side conical surface toward the outer edge of the inner side conical surface to form the convex strip. With the toothed structures, stray light can be scattered, and the intensity thereof can be reduced. Accordingly, the shower flare of the optical imaging lens mounted in the lens barrel can be alleviated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lens barrel, comprising a front end portion that comprises an outer surface facing toward an object side and an inner surface facing toward an image side, the inner surface comprising an inner side conical surface, the inner side conical surface being connected with the outer surface and comprising a plurality of toothed structures, an inner edge near the optical axis, and an outer edge away from the optical axis, the outer edge being closer to the image side than the inner edge, and the inner edge forming a clear hole, wherein:
each of the toothed structures comprises a tooth peak and a tooth valley, the tooth peak and the tooth valley are both disposed on the inner edge, and the tooth peak extends in a direction from the inner edge toward the outer edge to form a convex strip,
the outer surface further comprises a front-end conical surface, the front-end conical surface of the outer surface is connected with the inner side conical surface of the inner surface, and a reference plane comprising the optical axis is defined,
wherein:
a front end extending line of a front end sectional line of the front-end conical surface defined by the reference plane and the optical axis define a front end included angle, and the front end included angle satisfies a condition as follows:

$$5° \leq \theta_f \leq 70°,$$

wherein $\theta_f$ represents the front end included angle.

2. The lens barrel as claimed in claim 1, wherein the clear hole formed by the inner edge is a minimum clear hole in the lens barrel, and a vertical distance from any point on the inner edge to the optical axis is smaller than a vertical distance from any point on the lens barrel not on the inner edge to the optical axis.

3. The lens barrel as claimed in claim 1, wherein a width of each of the convex strips gradually increases toward the outer edge.

4. The lens barrel as claimed in claim 1, wherein an interval of each of the convex strips gradually decreases toward the outer edge.

5. The lens barrel as claimed in claim 1,
wherein:
an inner side extending line of an inner side sectional line of the inner side conical surface defined by the reference plane and the optical axis define an inner side included angle, and the inner side included angle satisfies a condition as follows:

$$20° \leq \theta_i \leq 90°,$$

wherein $\theta_i$ represents the inner side included angle.

6. The lens barrel as claimed in claim 1, wherein the front end sectional line of the front-end conical surface defined by the reference plane and an inner side sectional line of the inner side conical surface defined by the reference plane define a front end inner side included angle, wherein the front-end-and-inner-side included angle satisfies a condition as follows:

$$\theta_{fi} \geq 40°,$$

wherein $\theta_{fi}$ represents the front-end-and-inner-side included angle.

7. The lens barrel as claimed in claim 1, wherein the tooth valley extends in the direction from the inner edge toward the outer edge to form a recess relative to the convex strip, a vertical reference plane passing through the convex strips and the recesses and perpendicular to the direction in which the convex strips extend is defined, and
in the vertical reference plane,
a distance is present between a top surface center of a cross-section of each of the convex strips and a center of the corresponding and adjacent recess, and the lens barrel satisfies a condition as follows:

$$Dh \geq 2 \ \mu m,$$

wherein Dh represents a projection amount of the distance along a normal direction of the inner side conical surface.

8. The lens barrel as claimed in claim 1, wherein the tooth valley extends in the direction from the inner edge toward the outer edge to form a recess relative to the convex strip, a vertical reference plane passing through the convex strips and the recesses and perpendicular to the direction in which the convex strips extend is defined, and
in the vertical reference plane, a distance is present between a top portion center of a cross-section of each of the convex strips and a center of the corresponding and adjacent recess, and the lens barrel satisfies a condition as follows:

$$35 \ \mu m \geq Dw \geq 15 \ \mu m,$$

wherein Dw represents a projection amount of the distance along a circumferential direction of the inner side conical surface.

9. The lens barrel as claimed in claim 1, wherein a vertical reference plane passing through the convex strips and perpendicular to the direction in which the convex strips extend is defined, and a cross-section of each of the convex strips defined by the vertical reference plane is a rectangle-like cross-section.

10. The lens barrel as claimed in claim 9, wherein the tooth valley extends in the direction from the inner edge toward the outer edge to form a recess relative to the convex strip, a vertical reference plane passing through the convex strips and the recesses and perpendicular to the direction in which the convex strips extend is defined, and
in the vertical reference plane, the lens barrel satisfies conditions as follows:

$$35 \ \mu m \geq Wp \geq 15 \ \mu m; \text{ and}$$

$$25 \ \mu m \geq Wr \geq 5 \ \mu m,$$

wherein Wp represents a width of each of the convex strips, and Wr represents a width of the recess.

11. The lens barrel as claimed in claim 1, wherein a vertical reference plane passing through the convex strips and perpendicular to the direction in which the convex strips extend is defined, and a cross-section of each of the convex strips defined by the vertical reference plane is a triangle-like cross-section.

12. The lens barrel as claimed in claim 1, wherein a vertical reference plane passing through the convex strips and perpendicular to the direction in which the convex strips extend is defined, and a cross-section of each of the convex strips defined by the vertical reference plane is a trapezoid-like cross-section.

13. The lens barrel as claimed in claim 2, wherein a clear hole of the lens barrel closest to the object side is an object side clear hole, and the lens barrel further satisfies a condition as follows:

$$6.00 \geq D_o/D_{min} \geq 1.05,$$

wherein $D_o$ represents a diameter of the object side clear hole, and $D_{min}$ represents a diameter of the minimum clear hole.

14. The lens barrel as claimed in claim 2, wherein a clear hole of the lens barrel closest to the image side is an image side clear hole, and the lens barrel further satisfies a condition as follows:

$$9.00 \geq D_i/D_{min} \geq 1.00,$$

wherein Di represents a diameter of the image side clear hole, and $D_{min}$ represents a diameter of the minimum clear hole.

15. The lens barrel as claimed in claim 2, wherein the lens barrel is adapted to mount an optical imaging lens comprising a plurality of lens elements, the lens elements are sequentially arranged from the object side to the image side, each of the lens elements has an object side surface facing toward the object side and allowing an imaging beam to pass through and an image side surface facing toward the image side and allowing the imaging beam to pass through, and the lens barrel further satisfies a condition as follows:

$$3.10 \geq TL/D_{min} \geq 0.60,$$

wherein TL represents a distance on the optical axis from the object side surface of the lens element closest to the object side to the image side surface of the lens element closest to the image side, and $D_{min}$ is a diameter of the minimum clear hole.

\* \* \* \* \*